United States Patent
Nakano et al.

(10) Patent No.: US 6,169,142 B1
(45) Date of Patent: Jan. 2, 2001

(54) THERMAL CONDUCTIVE SILICONE RUBBER COMPOSITIONS AND METHOD OF MAKING

(75) Inventors: Akio Nakano; Takeshi Hashimoto, both of Usui-gun (JP)

(73) Assignee: Shin Etsu Chemical Co., Ltd., Tokyo (JP)

(*) Notice: Under 35 U.S.C. 154(b), the term of this patent shall be extended for 0 days.

(21) Appl. No.: 09/334,746

(22) Filed: Jun. 17, 1999

(30) Foreign Application Priority Data

Jun. 17, 1998 (JP) .................................... 10-186953

(51) Int. Cl.$^7$ ........................................ C08K 3/10
(52) U.S. Cl. ................ 524/862; 524/437; 524/588; 525/477; 525/479; 528/15
(58) Field of Search .................... 525/477, 479; 524/437, 862, 588; 528/15

(56) References Cited

U.S. PATENT DOCUMENTS

| | | | |
|---|---|---|---|
| 4,604,424 | * 8/1986 | Cole et al. | 524/862 |
| 5,008,307 | * 4/1991 | Inomata | 523/220 |
| 5,286,766 | * 2/1994 | Arai et al. | 523/213 |
| 5,352,724 | * 10/1994 | Fujuki et al. | 524/398 |
| 5,705,258 | 1/1998 | Okami et al. | |

FOREIGN PATENT DOCUMENTS

| | | |
|---|---|---|
| 64-69661 | 3/1989 | (JP) . |
| 2-196453 | 8/1990 | (JP) . |
| 7-266356 | 10/1995 | (JP) . |
| 8-238707 | 9/1996 | (JP) . |
| 9-1738 | 1/1997 | (JP) . |
| 9-296114 | 11/1997 | (JP) . |

OTHER PUBLICATIONS

English abstract for JP 2–196453.
English abstract for JP 7–266356.
English abstract for JP 8–238707.
English abstract for JP 9–296114.
English abstract for JP 64–69661.

* cited by examiner

*Primary Examiner*—Robert Dawson
*Assistant Examiner*—Marc S. Zimmer
(74) *Attorney, Agent, or Firm*—Millen, White, Zelano & Branigan, P.C.

(57) ABSTRACT

Silicone rubber parts having a high thermal conductivity and low hardness are obtained by molding and curing a composition comprising (A) 100 parts by weight of an alkenyl-bearing organopolysiloxane having a viscosity of up to about 500,000 centistokes at 25° C., (B) 300–1,200 parts by weight of aluminum oxide powder, (C) 0.05–10 parts by weight of an alkoxysilane of the formula: $R^1_a Si(OR^2)_{(4-a)}$ wherein $R^1$ is a monovalent $C_{6-20}$ hydrocarbon group, $R^2$ is a $C_{1-6}$ alkyl group, and a=1, 2 or 3, (D) a platinum group metal catalyst, and (E) an organohydrogenpolysiloxane containing at least two SiH groups in a molecule. The composition is formulated so as to suppress the viscosity increase of a liquid silicone rubber composition due to heavy loading of aluminum oxide.

6 Claims, No Drawings

THERMAL CONDUCTIVE SILICONE RUBBER COMPOSITIONS AND METHOD OF MAKING

This invention relates to thermal conductive silicone rubber compositions yielding low-hardness, heat transfer cured products and a method for preparing the same.

BACKGROUND OF THE INVENTION

Since heat-generating electronic parts such as power transistors and thyristors are deteriorated by the heat generated therein, the prior art often employs a countermeasure of attaching heat sinks to electronic parts for heat dissipation or installing electronic parts in contact with metallic chassises of equipment for heat to find a way out. To improve both electrical insulation and heat transfer, heat dissipating insulative sheets of silicone rubber loaded with thermal conductive fillers are often disposed between heat-generating electronic parts and heat sinks.

As the degree of integration is increasing in electronic equipment such as personal computers, word processors and CD-ROM drives, the amount of heat generated by integrated circuit chips such as LSI and MPU in the equipment is also increasing. Conventional cooling means are unsatisfactory for accommodating some integrated circuit chips. Especially in the case of personal computers of the portable notebook type, a large heat sink or cooling fan cannot be mounted in the equipment because the available interior space is limited. In these equipment, integrated circuit chips are mounted on printed wiring boards which are typically made of glass-reinforced epoxy resins and polyimide resins having poor heat transfer. It is then impossible to relieve heat to the boards through heat-dissipating insulative sheets as in the prior art.

Under the circumstances, one common approach is to dispose heat-dissipating parts of the natural convection or forced convection cooling type in proximity to integrated circuit chips such that the heat generated in the chip may be conveyed to the heat-dissipating part. If the heat-dissipating part is in close contact with the chip, the heat transfer therebetween is poor because of surface irregularities. Even if a heat-dissipating insulative sheet intervenes therebetween, because of somewhat poor flexibility of the heat-dissipating insulative sheet, heat expansion can apply stresses between the chip and the part, leading to a failure. If each circuit chip is provided with a heat-dissipating part, an extra space becomes necessary, compromising the target of equipment size reduction. For this reason, it is a common practice to cool a plurality of chips with a single heat-dissipating part. In particular, since tape carrier package MPUs for use in notebook type personal computers are thinner and produce greater amounts of heat than other chips, full considerations must be taken on their cooling system.

The performance of MPU improves as the drive frequency becomes higher every year. Since the amount of heat generated increases accordingly, there is a demand for a more thermal conductive material.

For several chips having different heights, a low-hardness, high-thermal conductivity material which can fill in gaps between the chips is demanded. To meet such a demand, there were proposed thermal conductive sheets that are highly thermal conductive and flexible and adaptable to gaps of various dimensions.

JP-A 2-196453 discloses a sheet comprising a silicone layer formed of a silicone in admixture with a thermal conductive material such as metal oxide and having a necessary strength to handle, on which a soft flexible silicone layer is laid. JP-A 7-266356 discloses a thermal conductive composite sheet comprising a silicone rubber layer loaded with a thermal conductive filler and having an Asker C hardness of 5 to 50 and a porous reinforcement layer having pores with a diameter of at least 0.3 mm. JP-A 8-238707 discloses a sheet comprising a flexible three-dimensional reticulated or foam body in which skeleton lattices are surface coated with thermal conductive silicone rubber. JP-A 9-1738 discloses a thermal conductive composite sheet having a reinforcing film or cloth incorporated therein, which is tacky on at least one surface and has an Asker C hardness of 5 to 50 and a thickness of up to 0.4 mm. JP-A 9-296114 discloses a heat-dissipating spacer formed of a composition comprising an addition reaction type fluid silicone rubber and a thermal conductive insulating ceramic powder, the composition curing into a part having an Asker C hardness of up to 25 and a thermal resistance of up to 3.0° C./W.

However, if one attempts to further increase the thermal conductivity of such low-hardness thermal conductive sheets by blending a large amount of thermal conductive filler therein, the flow of the composition is drastically exacerbated to such an extent that the molding and working thereof becomes difficult.

As a solution to this problem, JP-A 1-69661 discloses a high thermal conductive rubber/plastic composition filled with an alumina filler consisting of 10 to 30% by weight of alumina particles having a mean particle size of up to 5 μm and the balance of spherical corundum particles having a mean particle size of at least 10 μm and configured to be free of cutting edges. With such a combination of alumina particles alone, if one attempts to load the composition with 80% by weight or more of alumina particles, the composition is limited in flow.

SUMMARY OF THE INVENTION

An object of the invention is to provide a thermal conductive silicone rubber composition which is designed so as to suppress the viscosity increase of a liquid silicone rubber composition due to heavy loading of aluminum oxide and which can be molded and cured into a silicone rubber part having a high thermal conductivity and low hardness. Another object of the invention is to provide a method for preparing the thermal conductive silicone rubber composition.

The inventor has found that a silicone rubber composition of the addition reaction curing type comprising an alkenyl-bearing organopolysiloxane, aluminum oxide powder, and an alkoxysilane having a monovalent long-chain hydrocarbon group maintains a certain degree of fluidity even when the composition is heavily loaded with aluminum oxide. Then the composition can be effectively molded and worked, and reduced in hardness. The high loading of aluminum oxide imparts a high thermal conductivity. Without a need for expensive fillers such as boron nitride and aluminum nitride, high thermal conductivity molded parts can be manufactured. It has also been found that by mixing an alkenyl-bearing organopolysiloxane with aluminum oxide powder and an alkoxysilane having a monovalent long-chain hydrocarbon group, milling the blend at a temperature of 40° C. or higher, for thereby reducing the viscosity of the blend, and adding a platinum group metal catalyst and an organohydrogenpolysiloxane to the mixture at a temperature below 40° C., there is obtained a silicone rubber composition which is more advantageous.

Accordingly, the present invention provides a thermal conductive silicone rubber composition comprising (A) 100 parts by weight of an alkenyl-bearing organopolysiloxane having a viscosity of up to about 500,000 centistokes at 25° C., (B) 300 to 1,200 parts by weight of aluminum oxide powder, (C) 0.05 to 10 parts by weight of an alkoxysilane of the following general formula (1):

$$R^1_a Si(OR^2)_{(4-a)} \quad (1)$$

wherein $R^1$ is a substituted or unsubstituted monovalent hydrocarbon group of 6 to 20 carbon atoms, $R^2$ is an alkyl group of 1 to 6 carbon atoms, and letter a is equal to 1, 2 or 3, (D) a catalytic amount of a platinum group metal catalyst, and (E) an amount of an organohydrogenpolysiloxane containing at least two hydrogen atoms each attached to a silicon atom in a molecule, the amount of the organohydrogenpolysiloxane being such that the molar ratio of SiH groups in component (E) to alkenyl groups in component (A) may range from 0.05/1 to 3/1.

In another aspect, the invention provides a method for preparing the thermal conductive silicone rubber composition, comprising the steps of mixing components (A), (B) and (C) while heating at a temperature of at least 40° C., and blending the resulting mixture with components (D) and (E) at a temperature below 40° C.

DETAILED DESCRIPTION OF THE INVENTION

In the thermal conductive silicone rubber composition of the invention, component (A) is an alkenyl-bearing organopolysiloxane having a viscosity of up to about 500,000 centistokes at 25° C. The organopolysiloxane used herein is preferably of the following average compositional formula (2):

$$R^3_n SiO_{(4-n)/2} \quad (2)$$

wherein $R^3$ is a substituted or unsubstituted monovalent hydrocarbon group and n is a positive number of from 1.95 to 2.05. Since alkenyl groups serve as crosslinking sites upon curing, basically the composition will not cure unless molecules containing at least two alkenyl groups are included. The content of alkenyl groups in $R^3$ is preferably 0.001 to 5 mol %, and especially 0.01 to 0.5 mol %.

In the average compositional formula (2), $R^3$ represents substituted or unsubstituted monovalent hydrocarbon groups, preferably having 1 to 12 carbon atoms, especially 1 to 8 carbon atoms, for example, alkenyl groups such as vinyl and allyl, alkyl groups such as methyl, ethyl and propyl, cycloalkyl groups such as cyclopentyl and cyclohexyl, aryl groups such as phenyl and tolyl, and substituted ones of the foregoing groups in which some of the hydrogen atoms are replaced by chlorine or fluorine atoms. Preferred are organopolysiloxanes whose backbone is composed of dimethylsiloxane units or such organopolysiloxanes having vinyl, phenyl or trifluoropropyl groups introduced into their backbone. These organopolysiloxanes may be blocked with a triorganosilyl or hydroxyl group at an end of their molecular chain while exemplary triorganosilyl groups are trimethylsilyl, dimethylvinylsilyl and trivinylsilyl.

The organopolysiloxane as component (A) should have a viscosity of up to about 500,000 centistokes at 25° C., preferably about 200 to about 500,000 centistokes at 25° C., more preferably about 400 to about 100,000 centistokes at 25° C. With a too high viscosity, the composition becomes less flowing and less easy to work with upon molding.

Component (B) is aluminum oxide powder which is usually $\alpha$-$Al_2O_3$ having a crystalline structure of hexagonal or hexagonal-rhombic face lattice, appears as white crystals on the outer appearance, and apparently consists of particles having a mean particle size of about 2 to about 80 $\mu$m, each in the form of an alumina primary crystal having a size of about 0.2 to about 20 $\mu$m. Selection may be made from those commonly used as a thermal conductive filler. Preferably the aluminum oxide powder has a mean particle size of up to 50 $\mu$m because particles with a mean particle size of greater than 50 $\mu$m would be less dispersible so that aluminum oxide particles can precipitate when the composition is left to stand.

The aluminum oxide powder is preferably particles of a rounded or spherical shape because rounded particles are more effective for suppressing a viscosity increase of the composition even when heavily loaded therewith. Such spherical aluminum oxide can be prepared by known methods, for example, the methods of JP-A 52-15498 and 2-199004. Commercially available examples are spherical alumina AS series from Showa Denko K.K. and high purity spherical alumina AO series from Admatechs K.K.

It is effective to combine an aluminum oxide powder having a larger particle size with another aluminum oxide powder having a smaller particle size in a proportion meeting the closest packing theory distribution curve. This combination gives the advantages of an improved packing efficiency, a reduced viscosity, and enhanced heat transfer.

An appropriate amount of aluminum oxide powder (B) blended is about 300 to 1,200 parts, preferably about 400 to 1,000 parts by weight, per 100 parts by weight of component (A). Less than 300 parts of aluminum oxide is insufficient to endow the composition with a high thermal conductivity whereas compositions filled with more than 1,200 parts of aluminum oxide are too viscous to mold.

Component (C) is an alkoxysilane of the following general formula (1):

$$R^1_a Si(OR^2)_{(4-a)} \quad (1)$$

wherein $R^1$ is a substituted or unsubstituted monovalent hydrocarbon group of 6 to 20 carbon atoms, $R^2$ is an alkyl group of 1 to 6 carbon atoms, and letter a is equal to 1, 2 or 3.

In formula (1), $R^1$ represents substituted or unsubstituted monovalent hydrocarbon groups of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred. If $R^1$ is an alkyl group of less than 6 carbon atoms, the alkoxysilane becomes ineffective for lowering the viscosity of the composition and can allow the composition to increase its viscosity. If $R^1$ is an alkyl group of more than 20 carbon atoms, the alkoxysilane becomes incompatible with the alkenyl-bearing organopolysiloxane (A) and tends to quickly separate out.

$R^2$ represents alkyl groups of 1 to 6 carbon atoms, such as methyl, ethyl, propyl, butyl, pentyl and hexyl, and mixtures thereof. Illustrative examples of $OR^2$ include methoxy, ethoxy, propoxy, and butoxy, with the methoxy and ethoxy being preferred. Letter a is equal to 1, 2 or 3, preferably 1.

Illustrative, non-limiting examples of the alkoxysilane (C) include $C_6H_{13}Si(OCH_3)_3$, $C_8H_{17}Si(OC_2H_5)_3$, $C_{10}H_{21}Si$ (OCH$_3$)$_3$, C$_{12}$H$_{25}$Si (OCH$_3$)$_3$, C$_{14}$H$_{29}$Si(OC$_2$H$_5$)$_3$, and C$_6$H$_5$—CH$_2$CH$_2$Si(OCH$_3$)$_3$.

It is to be noted that JP-A 8-325457 discloses a thermal conductive silicone rubber composition comprising (1) 100 parts by weight of an alkenyl-bearing organo-polysiloxane, (2) 0.1 to 50 parts by weight of an organohydrogenpolysiloxane, (3) 0.1 to 10 parts by weight of an organosiloxane containing at least one alkoxy or hydroxyl group attached to a silicon atom in a molecule, (4) 300 to 1,200 parts by weight of an alumina mixture consisting of 5 to 95% by weight of alumina having a mean particle size of less than 10 µm and 95 to 5% by weight of alumina having a mean particle size of 10 to 50 µm, and (5) a hydrosilylation catalyst. Component (3) in this composition is a partial hydrolytic condensate of alkoxysilane which is added for the purpose of imparting thixotropy to the composition (i.e., increasing the viscosity of the composition) for preventing alumina from settling. Component (3) is different in structure and effect from component (C) in the inventive composition.

An appropriate amount of alkoxysilane (C) blended is about 0.05 to 10 parts, preferably about 0.1 to 8 parts by weight, per 100 parts by weight of component (A). Less than 0.05 part of alkoxysilane (C) is ineffective for reducing the viscosity of the composition. With more than 10 parts of alkoxysilane (C), the viscosity reducing effect increases no more and the alkoxysilane can separate out.

Component (D) is a platinum group metal catalyst for promoting addition reaction. Exemplary catalysts are platinum black, chloroplatinic acid, alcohol modified products of chloroplatinic acid, and complexes of chloroplatinic acid with olefins, vinylsiloxanes or acetylene alcohols. Component (D) is added in a catalytic amount which may be selected in accordance with the desired curing rate. Often the catalytic amount is about 0.1 to about 1,000 ppm, especially about 1 to about 200 ppm of platinum based on the weight of component (A).

Component (E) is an organohydrogenpolysiloxane containing at least two hydrogen atoms each attached to a silicon atom (i.e., at least two SiH groups) in a molecule. It may be of straight, branched or cyclic molecule. Preferably, it has the following average compositional formula (3):

$$H_b R_c SiO_{(4-b-c)/2} \quad (3)$$

wherein R is a substituted or unsubstituted monovalent hydrocarbon group of 1 to 10 carbon atoms and letters b and c are numbers satisfying 0<b<3, 0≦c<3, and 0<b+c <3. Examples of the hydrocarbon group represented by R are the same as exemplified above for R$^3$, preferably those free of an aliphatic unsaturated bond. More preferably R is methyl, phenyl or trifluoropropyl, most preferably methyl. Further preferably the organohydrogenpolysiloxane has a viscosity of about 1 to 1,000 centistokes at 25° C.

Component (E) serves as a crosslinking agent in that it undergoes addition reaction with alkenyl groups in component (A). Component (E) is added in such amounts that the amount of SiH groups in component (E) is 0.05 to 3 equivalents, preferably 0.1 to 2 equivalents per alkenyl group in component (A). On this basis, less than 0.05 equivalent provides a too low crosslinking density and hence, results in a cured composition having a lower hardness, indicating the difficulty of molding and handling. More than 3 equivalents results in a cured composition having a higher hardness, failing to form a low hardness thermal conductive sheet.

In the composition of the invention, other additives may be added for the purposes of adjusting the curing rate and shelf stability of the composition. Such additives include vinyl-bearing organopolysiloxanes such as methylvinylcyclotetrasiloxane, triallyl isocyanurate, acetylene alcohols and siloxane-modified products thereof. Additionally, reinforcing silica, colorants, heat resistance modifiers (such as iron oxide and cerium oxide), and adhesive agents may be added insofar as the objects of the invention are not impaired.

In preparing the composition of the invention, it is recommended to mill the alkenyl-bearing organopolysiloxane as component (A), the aluminum oxide powder as component (B) and the alkoxysilane as component (C) in a suitable mixer such as a planetary mixer, kneader or Sinagawa mixer while heating at a temperature of 40° C. or higher, especially 60 to 150° C. Even without heating, the viscosity of the composition can be reduced if milling is continued for a long time. However, it is preferable to promote the milling step by heating because the manufacturing process can be shortened and the mixer load be reduced.

The resulting mixture is cooled below 40° C., preferably to room temperature. Thereafter, the platinum group metal catalyst as component (D) and the organohydrogenpolysiloxane as component (E) are added to and blended with the mixture, obtaining the thermal conductive silicone rubber composition of the invention.

The composition of the invention cures into a thermal conductive silicone rubber product which has a hardness in the range of 2 to 50, preferably 5 to 40, as measured by an Asker C hardness tester. When converted into the JIS A hardness commonly used in the hardness measurement of silicone rubber, the hardness in the above range approximately corresponds to a JIS A hardness of at most 20, indicating a very low hardness. The Asker C hardness is determined in accordance with SRIS 0101 (the Standard of the Japanese Rubber Society) and JIS S 6050. An assembly of two stacked sheets each of 6 mm thickness was measured for hardness by means of a spring type Asker C hardness tester. A rubber layer with an Asker C hardness of less than 2 would be weak and difficult to mold, and unsuitable for mass production. A rubber layer with an Asker C hardness of more than 50 would be too hard, loses close contact with a heat-generating part, and poorly follows the geometry thereof.

The thermal conductive silicone rubber composition of the invention is useful in the form of thermal conductive silicone rubber sheets. The silicone rubber sheets may be reinforced by incorporating in the interior a suitable reinforcement, for example, glass cloth, cloth or non-woven fabric of polyesters or nylon, or resin films of polyimides, nylon or polyesters. Since this reinforcement improves the strength of the sheet and restrains the elongation thereof, the sheet becomes more easy to handle, improving the working efficiency.

The thermal conductive silicone rubber composition can be formed into sheets by various methods including mold shaping, injection molding, and coating. The mold shaping involves casting an uncured liquid composition into a mold, closing the mold, and applying heat and pressure by means of a heat press, thereby curing the composition. In the injection molding method, an uncured liquid composition is injected into a heated mold of an injecting molding machine, thereby filling the mold cavity with the composition. After curing, the mold is opened and the sheet is taken out. In the coating method, while a carrier film (for example, of PET) is continuously fed to a coating machine, an uncured liquid composition is applied onto the carrier film to a predetermined thickness through a knife coater, etc. The coated film is passed through a heating oven for curing the liquid composition.

The conditions under which the silicone rubber composition of the invention is cured usually include a temperature of about 60 to 200° C. and a time of about 20 seconds to about 60 minutes although they vary with the particular forming procedure and shape.

The thermal conductive silicone rubber compositions of the invention have the following advantages. (1) Even when the compositions are heavily loaded with aluminum oxide, they maintain a certain degree of flow and are effectively moldable or shapable. (2) The high loading of aluminum oxide imparts a high thermal conductivity. (3) Since the base is a fluid silicone rubber of the addition curing type, a low hardness as expressed by an Asker C hardness of up to 50 can be achieved. If the base is millable type silicone rubber, a hardness of about 20 in JIS A hardness (corresponding to an Asker C hardness of about 45) is the lower limit. (4) High thermal conductivity parts can be shaped or molded without a need for expensive thermal conductive fillers such as boron nitride and aluminum nitride.

Therefore, the thermal conductive silicone rubber compositions of the invention are best suited as low hardness, high thermal conductivity silicone rubber sheets which are used for heat dissipation purpose with integrated circuit chips such as LSI and MPU in such electronic equipment as personal computers, word processors, and CD-ROM drives.

EXAMPLE

Examples of the invention are given below by way of illustration and not by way of limitation.

Examples 1–5 & Comparative Example 1

The ingredients used were 70 parts by weight of a vinyl-bearing dimethylpolysiloxane blocked with a dimethylvinylsiloxy group at either end and having a viscosity of 30,000 centistokes at 25° C., 30 parts by weight of a vinyl-bearing dimethylpolysiloxane blocked with a dimethylvinylsiloxy group at either end and having a viscosity of 600 centistokes at 25° C., 640 parts by weight of spherical aluminum oxide powder AS-30 having a mean particle size of 16 μm (trade name, Showa Denko K.K.), 160 parts by weight of random shape aluminum oxide powder AL-45-H having a mean particle size of 3 μm (trade name, Showa Denko K.K.), and the amount shown in Table 1 of decyltrimethoxysilane $C_{10}H_{21}Si(OCH_3)_3$. Using a planetary mixer, the ingredients were mixed at room temperature for 30 minutes. The compositions thus obtained were measured for viscosity. Next, using the planetary mixer, the compositions were mixed for 30 minutes while heating at 100° C., following which they were again measured for viscosity. For comparison purposes, a composition was prepared by the same procedures as above except that decyltrimethoxysilane was omitted, and measured for viscosity.

After each of the compositions was cooled, 0.36 part by weight of a vinylsiloxane complex of chloroplatinic acid (platinum content 1%) was uniformly mixed with the composition. Next, 0.09 part by weight of ethynyl cyclohexanol was added and mixed therewith, and 0.2 part by weight of organohydrogenpolysiloxane of the following formula having a viscosity of 18 centistokes at 25° C. (SiH content 0.0031 mol/g) was uniformly mixed therewith, obtaining a thermal conductive silicone rubber composition. The molar ratio of SiH groups to vinyl groups was 0.5/1.

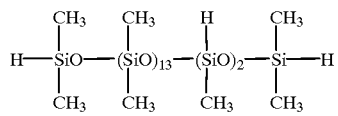

The thermal conductive silicone rubber compositions were shaped in a mold and heated at 150° C. for 10 minutes, obtaining sheets of 6 mm thickness, which were measured for hardness by means of an Asker C hardness tester.

Separately, blocks of 20 mm thickness were molded from the compositions and measured for thermal conductivity by means of a thermal conductivity tester Shotherm (QTM quick thermal conductivity tester by Showa Denko K.K.).

The results are shown in Table 1.

TABLE 1

|  | Example | | | | | |
| --- | --- | --- | --- | --- | --- | --- |
|  | 1 | 2 | 3 | 4 | 5 | CE1 |
| Decyltrimethoxy silane (pbw) | 0.5 | 1 | 2 | 4 | 6 | 0 |
| Viscosity (p) after mixing at RT | 29,000 | 32,000 | 35,000 | 31,000 | 26,000 | 19,000 |
| Viscosity (p) after mixing at 100° C. | 13,000 | 10,000 | 9,000 | 7,800 | 6,800 | 19,000 |
| Asker C hardness | 33 | 32 | 30 | 28 | 25 | 35 |
| Thermal conductivity (cal/cm · sec · ° C.) | 6.1 × $10^{-3}$ | 5.9 × $10^{-3}$ | 5.9 × $10^{-3}$ | 5.7 × $10^{-3}$ | 5.5 × $10^{-3}$ | 6.2 × $10^{-3}$ |

Example 6 & Comparative Example 2

Thermal conductive silicone rubber compositions were prepared by the same procedure as in Example 3 except that 2 parts by weight of hexyltrimethoxysilane $C_6H_{13}Si(OCH_3)_3$ or 2 parts by weight of methyltriethoxysilane $CH_3Si(OC_2H_5)_3$ was added instead of the decyltrimethoxysilane. The compositions were measured for viscosity, hardness and thermal conductivity, with the results shown in Table 2.

TABLE 2

|  | Example 6 | CE2 |
| --- | --- | --- |
| Alkoxysilane | $C_6H_{13}Si(OCH_3)_3$ | $CH_3Si(OC_2H_5)_3$ |
| Viscosity (p) after mixing at RT | 36,000 | 20,000 |
| Viscosity (p) after mixing at 100° C. | 11,000 | 19,000 |
| Asker C hardness | 28 | 32 |
| Thermal conductivity (cal/cm · sec · ° C.) | 5.8 × $10^{-3}$ | 5.6 × $10^{-3}$ |

Japanese Patent Application No. 10-186953 is incorporated herein by reference.

Reasonable modifications and variations are possible from the foregoing disclosure without departing from either the spirit or scope of the present invention as defined by the claims.

What is claimed is:

1. A thermal conductive silicone rubber composition comprising
   (A) 100 parts by weight of an alkenyl-bearing organopolysiloxane having a viscosity of up to about 500,000 centistokes at 25° C.,
   (B) 300 to 1,200 parts by weight of aluminum oxide powder,
   (C) 0.05 to 10 parts by weight of an alkoxysilane of the following general formula (1):

$$R^1_a Si(OR^2)_{(4-a)} \tag{1}$$

wherein $R^1$ is a substituted or unsubstituted monovalent hydrocarbon group of 6 to 20 carbon atoms, $R^2$ is an alkyl group of 1 to 6 carbon atoms, and letter a is equal to 1, 2 or 3,
   (D) a catalytic amount of a platinum group metal catalyst, and
   (E) an amount of an organohydrogenpolysiloxane containing at least two hydrogen atoms each attached to a silicon atom in a molecule, the amount of the organohydrogenpolysiloxane being such that the molar ratio of SiH groups in component (E) to alkenyl groups in component (A) may range from 0.05/1 to 3/1.

2. The silicone rubber composition of claim 1 wherein the aluminum oxide powder (B) has a mean particle size of up to 50 μm.

3. The silicone rubber composition of claim 1 wherein the aluminum oxide powder (B) contains spherical particles.

4. The silicone rubber composition of claim 1 wherein in the alkoxysilane (C), $R^1$ is an alkyl group of 6 to 20 carbon atoms.

5. The silicone rubber composition of claim 1 which cures into a product having an Asker C hardness of 2 to 50.

6. A method for preparing the thermal conductive silicone rubber composition of claim 1, comprising the steps of:
   mixing components (A), (B) and (C) while heating at a temperature of at least 40° C., and
   blending the resulting mixture with components (D) and (E) at a temperature below 40° C.

* * * * *